Figure 1:
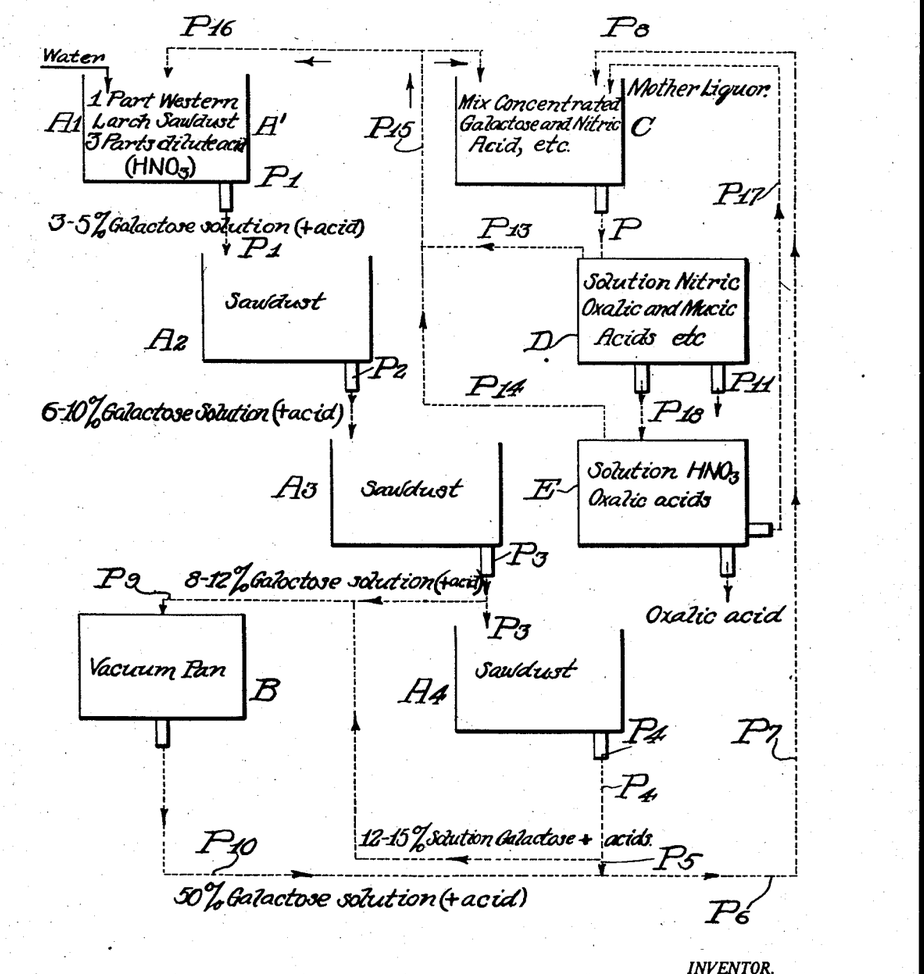

July 28, 1931.  S. F. ACREE  1,816,137

METHOD OF CONVERTING WOOD INTO MUCIC ACID

Filed March 25, 1920

INVENTOR.
Solomon F. Acree
BY
A. B. Foster
ATTORNEY.

Patented July 28, 1931

1,816,137

UNITED STATES PATENT OFFICE

SOLOMON FARLEY ACREE, OF SYRACUSE, NEW YORK, ASSIGNOR OF ONE-TENTH TO ARTHUR B. FOSTER, OF WASHINGTON, DISTRICT OF COLUMBIA

METHOD OF CONVERTING WOOD INTO MUCIC ACID

Application filed March 25, 1920. Serial No. 368,641½.

The fermentation of carbohydrates in general, and of glucose and cane sugar in particular, for the direct or indirect production of organic acids or of ethyl alcohol and other alcohols is a biological process that has been applied commercially on a large scale. The manufacture of acetic, lactic, valerianic, butyric and other acids by these processes is well known. It will be noted that in these biological changes the six-carbon carbohydrates are broken down into acids or alcohols with a smaller number of carbon atoms in each molecule, much of the carbon going into the formation of the less valuable carbon dioxide, for example. Furthermore the aforesaid organic acids are reduced compounds and do not have oxygen-bearing (hydroxyl) groups attached to each carbon, as in the carbohydrates, and they are therefore not as widely used as are the corresponding polyhydroxy dibasic acids, tartaric acid, for example. But the direct chemical change of carbohydrates into organic acids, especially into the polyhydroxy monobasic or dibasic acids having the same number of carbons found in the carbohydrates, is a process that has found practically no development in the arts.

The object of the present invention is to provide a process that can be carried on continuously in a cycle and that will enable us to produce large yields of the non-reduced polyhydroxy monobasic and dibasic acids from carbohydrates, particularly those from vegetable and woody materials. I shall describe my process, by way of illustration, as applied to the treatment of one particular kind of wood; viz., western larch, but any wood or vegetable substance containing carbohydrates of the kind hereinafter referred to may be utilized in my process or method. It has been found that this particular tree, and especially the butt portion, which is a waste product in the production of larch lumber and which constitutes the residue best available for use in a process of this sort, contains an unusually large proportion (15 to 18 percent of the dry weight of the wood, as compared with 8 to 10 percent in the body of the same tree) of galactose-bearing compounds called "galactans" because they may be converted into the hexose called galactose.

Galactans and galactose in aqueous solution can be oxidized to mucic acid by the action of bromine, chlorine or more vigorous agents such as chloric acid. I have also used air and suitable catalysts, such as vanadic acid and oxides of nitrogen, NO and $NO_2$, etc., at elevated temperatures; and have used air and oxygen in the presence of ultraviolet light. Twenty-five percent nitric acid, however, has been used most advantageously and yields of mucic acid corresponding to 60 to 75 percent of the weight of the galactose have been obtained. When nitric acid has been used (in the old analytical method) it has been the custom to treat the plane tissues directly with the acid at an elevated temperature whereby the galactans are converted into mucic acid. I have found too that western larch can also be converted partially into mucic acid by direct treatment with nitric acid, but my improved process is best carried out in the following manner, which, however, is only one of the methods which I can employ.

I have found, that the western larch sawdust can be practically completely freed of galactose-bearing compounds together with other desirable sugars and smaller amounts of other undesired compounds in one kind of "liquid cook" operation described in another patent application 160,909, filed April 10, 1917, renewed April 2, 1921, Ser. No. 458,133, and involving simultaneously both the hydrolysis and extraction; namely, by about three extractions with three parts of a dilute hydrolytic and solvent solution at a temperature not far below, and not necessarily much above, 100° C. The hydrolytic agent may be a dilute or concentrated solution of sulphuric, hydrochloric, phosphoric or other inorganic acids, or even organic acids such as those recovered in the present process, for making mucic acid, and including saccharic, oxalic and mucic acids. But I use preferably in the present instance a dilute solution having a concentration of less than two percent of sulphuric acid or of the nitric and nitrous acids or the above-mentioned organic acids recovered in the production of mucic acid. This operation is most conveniently carried on in the usual continuous extraction battery containing three or more cells and each digestion continues about one hour at 95° C. to 100° C. In other words, fresh dilute acid or the fortified wash water from the spent sawdust is run into the first cell containing the sawdust which has been extracted the largest number of times, is then drained off and fortified with more acid when desired, and then run into the second cell containing the sawdust which had been extracted once less than that in the preceding first cell, and so on till the resulting acid sugar solution passes through the last cell containing fresh sawdust. The sawdust in the first cell is then washed with about three parts of water to dissolve and remove any adhering sugar and acid and this wash water is fortified with more hydrolytic agent or used directly to treat the sawdust in the second cell and so on as above. The spent washed sawdust in the first cell is then thrown out and used for fuel or for making cellulosic products such as pulp and paper, and replaced with fresh sawdust and this first cell of the preceding battery becomes the last cell of the next battery. With a sufficient number of cells I can secure a sugar solution having the desired concentration but I can also concentrate the sugar solution to any desired degree in open vessels or vacuum pans.

One of the most important advantages of my "liquid cook" method is that I can use as the hydrolytic agent some of the organic acids recovered in the production of mucic acid, or I can use nitric and nitrous acids which I employ also for the oxidation of the carbohydrate into the desired organic acid or acids. I can also use the "mother liquors" from the mucic acid, described below, which contain nitric and nitrous acids and organic acids. Loss of nitric and nitrous acid and oxides of nitrogen are avoided in my method. Even the use of sulphuric acid as the hydrolytic agent in the extraction batteries and the subsequent oxidation of this mixture with nitric acid involves no difficulties if the sulphuric acid is neutralized as described below. The presence of the sulphuric acid in the concentrated mother liquors from the mucic acid would cause decompositions of desirable products and difficulties in recoveries if such mother liquors were used repeatedly in oxidizing more galactose to mucic acid.

The sugar solution from the last cell can be concentrated directly when desired, or the strong acid such as sulphuric or nitric acid can be partially or wholly neutralized, leaving the weaker acids unneutralized, or all of the acids can be neutralized. The neutralization of the stronger acids is particularly desirable when they attack the coils and walls of the evaporating pans. Duriron is however particularly resistant to the action of all these acids. When sulphuric acid is used as the hydrolytic agent it can be neutralized partially with calcium hydroxide and finally with calcium carbonate with great advantage, especially as the precipitate or sludge brings down tannin-like bodies and greatly clarifies the sugar solution. Other well-known clarifying agents such as decolorizing carbons can be used simultaneously with this neutralization, or at another time, to aid in this clarification. The clarified sugar solution gives upon oxidation mucic acid which is very white when washed and properly treated, and of such fine quality as not to need further crystallization or purification for many uses.

When the galactose solution is obtained from the last cell of the extraction battery it can be used directly if it contains about 15 percent galactose or can be concentrated to any desired degree with the precautions discussed above. The galactose in the sugar solution of the desired concentration can be oxidized electrolytically or by various oxidizing agents into the polyhydroxy monobasic acid called galactonic acid and then still further oxidized into the polyhydroxy dibasic acid called mucic acid. One of the best known oxidizing agents is a 25 percent solution of pure nitric acid, but I have discovered that at temperatures from 50° C. to 85° C. a mixture of nitric and nitrous acids and oxides of nitrogen (particularly NO and $NO_2$) in a solution of 25% nitric acid and 10% galactose is many times as active as nitric acid alone in oxidizing galactose into mucic acid, and other sugars into their corresponding acids. I particularly recommend for this purpose the mixture of nitric and nitrous acids and oxides of nitrogen obtained from the nitric acid recovery towers referred to below. The amount of nitrous acid and oxides of nitrogen present need not be large, and will vary during the oxidation of the galactose into mucic acid, by reason of the reaction that takes place. But when the concentration of such nitrous acid and oxides of nitrogen is extremely low or zero in the mixture of nitric acid and galactose the oxidation of the galactose into mucic acid proceeds very slowly and I find it then advantageous to add nitrous acid or its salts or to produce the same effect by passing oxides of nitrogen, such as NO, $NO_2$, $N_2O_3$, and $N_2O_4$, into the mixture of nitric acid and galactose. A particularly useful and easy method is to generate such nitrous acid and oxides of nitrogen in the mixture of galactose and nitric by any well known reaction. A particularly useful source of such oxides of nitrogen is the mixture of water vapor and oxides of nitrogen, or the condensate from the same, arising from the very oxidation of galactose by such a mixture of nitric and nitrous acids and oxides of nitrogen. By simply passing a portion of such oxides of nitrogen into a mixture of 10% galactose and 25% pure nitric acid at 50° C. to 85° C. the reaction starts off vigorously. I particularly call attention to the feature of the process of increasing the rate of oxidation of sugars, particularly galactose, by nitric acid by the simple expedient of using any method whatsoever for producing such a mixture of galactose, nitric and nitrous acids and oxides of nitrogen.

In such oxidation of galactose I find it desirable to sweep these vapors and oxides of nitrogen, by means of a stream of air, out of the reaction vessel and then through about four nitric acid absorption or recovery towers in order to remove these obnoxious gases from the possibility of injuring the workers and especially in order to recover these oxides of nitrogen as nitric acid of about 35 to 50% strength, containing some nitrous acid and some of such oxides of nitrogen in solution.

The last portions of such oxides of nitrogen are recovered as nitrates and nitrites in towers through which alkaline solutions are circulated. These nitrates and nitrites can be distilled with sulphuric acid, for example, and converted back into nitric and nitrous acids. The recovered nitric and nitrous acids and oxides of nitrogen can be concentrated greatly by distillation, and the concentrated solutions can be used directly or in mixture with the mother liquors from mucic acid for the oxidation of the galactose into mucic acid; the dilute solutions of such acids can be used for absorbing the oxides of nitrogen in producing concentrated nitric acid in the first absorption towers, or can be used for the hydrolysis and extraction of the wood.

It is thus seen that the use and recovery of such nitric and nitrous acids and oxides becomes a cycle in my improved process.

The strength of the nitric acid and sugar, particularly galactose can be varied very widely in the solution for the production of mucic acid, particularly because the mucic acid is very insoluble and so precipitates out nearly completely. The galactose-bearing compounds of course yield the mucic acid, and some oxalic acid (perhaps through decomposition of the mucic acid and its lactones. The glucose and other sugars present are converted into gluconic and saccharic and oxalic acids, and other acids. If the oxalic and saccharic acids are not recovered from the rather concentrated filtrates, or so-called "mother liquors", from the mucic acid, which also contain considerable residual nitric acid, their formation will have represented a loss in the operations, particularly because they have required the handling and use of more nitric acid than is required for the galactose, and because they use up or reduce still more nitric acid when the nitric-acid-containing "mother liquors" are added to more galactose and nitric acid to produce more mucic acid. I have found, however, that I can obtain considerable quantities of oxalic acid from the "mother liquors" by cooling them and allowing them to stand and crystallize. Under these conditions I have obtained very pure oxalic acid in amount equivalent to 25 per cent of the weight of the mucic acid formed simultaneously and have reason to believe from the analysis of the mother liquors that this yield of oxalic acid can be considerably increased.

If the production of mucic acid alone is undertaken, and the mother liquors are used solely for hydrolyzing and extracting wood and for further oxidation of galactose, without attempting to isolate the oxalic acid and saccharic and other acids in such mother liquors, the nitric acid forming 5 to 15% of such mother liquors is used over and over again; part of it is evolved as oxides of nitrogen and recovered as nitric and nitrous acids in the nitric acid absorption towers, whereas part remains in the resulting mother liquors. In such a case the oxalic and saccharic acids are continuously oxidized to carbon dioxide and other volatile products. The oxalic and saccharic acids can be isolated as lime salts, for example, by neutralizing all the acids present with lime. The lime salts precipitate out and can be filtered, purified and converted into oxalic and saccharic acids by treatment with sulphuric acid, for example, and by proper crystallization. The calcium nitrate and nitrite in the filtrate from the calcium oxalate and saccharate can be recovered and used for fertilizer or for conversion to the sodium salts by treatment with sodium carbonate, or for any other purpose.

As stated above, the concentration of the nitric acid used for oxidizing the galactose and other sugars can vary widely, say from 15 per cent of the nitric acid-sugar mixture to say 85 per cent. The ratio of nitric acid to sugar can also vary considerably, say from a ratio of two parts of nitric acid to one of sugar up to 5 parts of nitric acid to one of sugar, or even higher. I find in general, however, that about three parts of nitric acid to one of sugar is very satisfactory; as, for example, a solution containing 25% of nitric acid and 8% of sugar at about 65° C. to 85° C. In general, the more dilute the solution the slower the reaction and the more necessary it is to heat the solution, although giving higher yields. Concentrated solutions of nitric and nitrous acids and sugar, however, react so vigorously and evolve so much heat that the temperature must be controlled carefully to prevent the reaction from becoming too violent. As I have found duriron vessels to be the most satisfactory material for use with such nitric acid solutions, it is very convenient to make the oxidation a continuous process and run the mixture of nitric acid and sugar in proper proportions downward through a jacketed circular duriron coil or jacketed series of connected so-called S tubes which serve the same purpose. The temperature of the jacket is then controlled to regulate the reaction as desired. The mixture of nitric acid, nitrous acid, mucic and other acids can flow down into a closed duriron storage vessel from which it is drawn from time to time to separate the mucic acid by filtration or otherwise, or can flow directly into a centrifuge to separate the mixture into mucic acid and the mother liquor. The oxides of nitrogen are drawn by suction upward through the duriron coil or S tubes, where they enter and tend to saturate the down-coming sugar acid mixture, and then through an oxidation chamber to complete the change of NO to $NO_2$, and then through a condenser to cool the oxides before they enter the nitric acid absorption towers; this pre-cooling of the oxides enables me to secure 50 per cent nitric from the absorption towers without difficulty. It is very advantageous to have the oxidation tower filled with a catalytic agent capable of hastening the oxidation of the NO into $NO_2$ and even $N_2O_5$, and such oxidation towers with catalyzer can be placed between the absorption towers. Such catalyzers as silica gel and platinum on a cellular support are recommended. The use of Raschig rings as a cellular filler in the duriron or stoneware absorption towers is very convenient. A duriron exhaust device (e. g. fan) from the end of the absorption tower system is excellent for drawing the oxides of nitrogen and air through the entire system. In fact the same fan can then force the issuing gases, still containing small traces of NO and $NO_2$, back through the entire system in a closed cycle to prevent the loss of such oxides. The oxygen used up in oxidizing the NO to $NO_2$ etc. can be replaced by passing or drawing oxygen or air into the circulating gases or by using fresh air at intervals to replace the gases issuing from the fan. As stated above sodium hydroxide or sodium carbonate or lime can be circulated in the final towers to absorb the final traces of NO and $NO_2$ as nitrite and nitrate, the former generally greatly predominating. Such nitrates and nitrites can be used for fertilizer or for preparation of nitric and nitrous acids or for other purposes. Such a continuous oxidation and absorption system, which is really a cyclical process, is very convenient because it permits of continuous, nearly automatic operations and because it enables the operator to build the plant in units and to choose the concentration and temperature of the sugar-nitric-nitrous acid mixture to suit his particular needs. If both ethyl alcohol and mucic acid are to be made from the galactose solution from the larch, the operator may prefer to use the more dilute solutions. If only mucic acid, possibly together with oxalic and saccharic acids, is to be made, the operator will probably prefer to concentrate the sugar solution in open or vacuum pans and work with acid-sugar mixtures containing say 35% nitric and nitrous acids and 12–15% sugars. Even higher concentrations have been used very successfully. The solutions may be evaporated to a thick molasses of say 80% sugar content, or to the state of a taffy, if desired.

As an alternative to the above continuous process I have used an intermittent process in two ways. The first is to use duriron or stoneware vessels, heated as desired, to hold the mixture of sugar and nitric and nitrous acids. Such vessels are connected with proper duriron or stoneware piping to the nitric acid absorption system as indicated above so that the oxides of nitrogen are collected as hereinbefore stated. The other method is to pass oxygen or air into a closed heated duriron or other suitable container so arranged that the oxygen becomes mixed with NO and $NO_2$ and forms more $NO_2$ etc. which gases are absorbed by the acid-sugar solution undergoing intimate contact with all parts of such gases. The oxygen is passed in until a predetermined degree of oxidation of the sugar is attained. The contents are cooled somewhat, if desired, filtered to remove the mucic acid, and cooled well to allow the oxalic acid to crystallize, as described above.

As stated above, I have also converted such sugar solution from western larch into mucic acid and other organic acids by the use of oxygen and air at elevated temperatures in the presence of ultraviolet light.

I believe that I am the first to produce the herein described new products of oxidation of sugar from western larch, whatever the method of oxidation.

When the crystalline mucic acid precipitate is formed slowly in the nitric acid sugar mixture, especially by keeping the solution agitated by stirring or by the vigorous reaction, the crystals of mucic acid are large and granular and when washed are free of oxalic and other acids or practically pure. This is the first time that such granular mucic acid has been described and this material is a valuable commercial and scientific article for many reasons.

In some cases I allow the mucic acid solutions to crystallize slowly at lower temperature, for example from the hot wash waters used to purify granular mucic acid. The mucic acid may then contain some oxalic acid and other acids which can be largely removed by proper washing with water. It can be finally purified by dissolving it in a sufficient amount of some alkaline agent, such as ammonia, clarifying the solution with a decolorizing agent, such as animal charcoal or vegetable charcoal, and acidifying the solution with a suitable agent such as sulphuric acid. If only one molecule of ammonia is used to dissolve the mucic acid as an acid salt, which is more soluble than the neutral or di-ammonium salt, the faintly acid solution is more easily clarified by decolorizing charcoal. But the mono-ammonium salt seems to form some lactone and the amount of mucic acid precipitated out is considerably less than the theoretical value; in time, however, nearly all of the mucic acid comes out because of the hydration of the soluble lactone. But by adding sufficient ammonia to such clarified acid ammonium salt, or to mucic acid, and heating and clarifying, the di-ammonium mucate is formed and clarified. When the sulphuric acid is added, the mucic acid then precipitates out nearly completely from the cool solutions in a very pure state and is filtered and dried. From the filtrate another very small portion of mucic acid is obtained. The filtrate containing the ammonium sulphate is then crystallized to recover the ammonium sulphate as such or is treated with a suitable alkali such as lime, and the ammonia gas is recovered by absorption by mucic acid or other agent or water in suitable absorption towers. The main point is that I consider the continuous use and recovery of the ammonia or other basic agent as a very important step in this method of purification of the mucic acid. The mucic acid can be used to produce allomucic, talomucic and tartaric acid, for example, or can be used as indicated above for a great many purposes for which at present tartaric and citric acids are employed. I include within the scope of my invention the use of mucic acid for any purpose naturally suggested to any one skilled in the art of making and using such polyhydroxy acids after he becomes acquainted with these disclosures.

The relatively small concentration of acid required in the hydrolyzing stage, as well as the low temperature, characterizing my improved process, distinguished the latter from the present commercial process, which is not nearly so convenient or advantageous in operation. I also emphasize the importance of the discovery that the admixture of nitrous acid (or oxides of nitrogen) to the nitric acid heretofore known as an oxidizing agent in connections such as are here involved greatly facilitates the oxidation and renders it more complete. The term "nitrous acid," as hereinafter used in the claims, is to be understood as comprehending such oxides as well, wherever the context so admits. In the case of the hydrolyzing stage, the nitrous acid, while not essential, is also useful, so that the process may be made a closed cycle of steps, as above described, so far as concerns the use over and over again of the acid re-agent. By my processes I convert the butt log western larch into yields of 30 to 40 per cent. of sugar and 10 to 15 per cent. of mucic acid. Depending upon the conditions employed, I can obtain galactose in an amount equivalent to 25 to 75 per cent. of the total sugar.

Other modes of applying the principle of my invention may be employed instead of the one explained, change being made as regards the method herein disclosed, provided the step or steps stated by any one of the following claims or the equivalent of such stated step or steps be employed.

The accompanying drawing represents, in a very diagrammatic way, the steps of carrying out the process and referring to said drawing A1, A2, A3 and A4, represent any suitable number of leaching vats, these being arranged if desired on successively lower levels in order that the liquors may flow by gravity from one leach to the next in the series. It is assumed that the leach A4, has been freshly charged with western larch in a comminuted form, say in the form of sawdust. The hot liquid, say constituting a slightly acid solution of galactose and containing say 8 to 12% of galactose is run from A3 into A4. Then the hot liquor from A2 is run into A3 and then the hot liquor from A1 is run into A2. The sawdust in A1 can now be washed with wash-water to remove any remaining galactose and acid, and the sawdust can then be dumped out of A1 which is then ready to be recharged either with sawdust from A2 already partly leached, or with fresh sawdust and may become the last leach in the series.

As indicated pipes P1, P2, P3 and P4 can be used for carrying the liquors through the series of leaches, it being understood that suitable valves or plugs are provided in the various pipes or conduits shown in the drawing.

The liquor leaving the last leach of the series may travel through pipes P4, P5, P6, P7 and P8 into the vessel C (consisting of one or more towers or tanks) or liquor from the last unit or from any unit of the leaching system may pass through pipe P9 into the vacuum pan B or other suitable concentrator for being concentrated to the desired extent, for example up to 50% galactose, which solution may pass through pipe P10 into pipe P6, etc. as indicated above. Or it may be concentrated to a solid or paste or taffy, in this stage. In the tank, tower or other device C, the galactose is treated with $HNO_3$ and oxides of nitrogen.

The concentrated galactose and nitric acid mixture may be passed from the tank C through pipe P into the principal reaction vessel D, and it may be heated therein, air being blown through the same if desired, to cause the nitric acid to act upon the galactose and other sugars to form mucic and oxalic acids. The liquid therein then being cooled or being cooled during its passage through this tank or reaction vessel or system of pipe, causes the mucic acid to largely crystallize or precipitate in the liquor, this being removed for example by P11, for any subsequent purification which may be desired.

The remaining solution may contain a sufficient amount of oxalic acid to warrant a recovery of the same at this stage, and if so the said liquor is passed by pipe P18, into the oxalic acid crystallizing tank E, in which the oxalic acid can be crystallized or otherwise removed from the solution.

The gases and vapors from D and E may pass either from the tank D through pipe P13 or from the tank E through pipe P14, into the pipe P15, pipe P16 and back into the leaching system A' etc., or recovery system C for utilization. The mother liquor from E can pass through pipe P17 back to receptacle or tower C if desired.

I, therefore, particularly point out and distinctly claim as my invention:

1. In a process of the character described, the steps which consist in treating a quantity of western larch in the presence of water with a hydrolytic agent, drawing off the resulting galactose solution with residual hydrolytic agent, treating a quantity of such fresh wood with such solution, and so on until a solution of desired degree of concentration is obtained, and then oxidizing the galactose in the final solution to mucic acid.

2. In a process of the character described, the steps which consist in treating a quantity of western larch in the presence of water with a hydrolytic agent, drawing off the resulting galactose solution with residual hydrolytic agent, treating a quantity of such fresh wood with such solution, and so on until a solution of desired degree of concentration is obtained, and then oxidizing the galactose in the final solution to mucic acid by treating the same with a mixture of nitric and nitrous acids.

3. In a process of the character described, the step which consists in oxidizing galactose to mucic acids by treating the same with a mixture of nitric and nitrous acids in a solution.

4. In a process of the character described, the steps which consist in oxidizing galactose to mucic acid by treating a solution of such galactose with a mixture of nitric and nitrous acids, separating out the music acid thus formed, and using the residual acid solution to hydrolyze western larch.

5. In a process of the character described, the steps which consist in oxidizing galactose to mucic acid by treating a solution of such galactose with a mixture of nitric and nitrous acids, some oxalic acid being also incidentally formed, separating out the mucic acid, adding the residual acid solution to more of the galactose solution, and repeating until the oxalic acid accumulates to an amount where it can be separated out, substantially as described.

6. In a process of the character described, the steps which consist in oxidizing galactose to mucic acid by treating a solution of such galactose with a mixture of nitric and nitrous acids, separating out the mucic acid, and using the residual acid solution to oxidize more galactose solution.

7. In a process of the character described, the steps which consist in oxidizing galactose to mucic acid by treating a solution of such galactose with a mixture of nitric and nitrous acids, and oxides of nitrogen being given off during the formation and concentration of the mucic acid, and during the evaporation of the residual solution after separation of such mucic acid therefrom, recovering such nitric and nitrous acids and oxides, and treating more galactose solution therewith.

8. In a process of the character described, the steps which consist in hydrolyzing a quantity of wood with nitric and nitrous acids, drawing off in solution the resulting sugar with residual acid, adding more nitric and nitrous acid to such solution, separating out the mucic acid thus formed, and using the residual acid solution to hydrolyze more wood.

9. In a process of the character described, the steps which consist in hydrolyzing a quantity of wood with nitric and nitrous acid, drawing off in solution the resulting sugar with residual acid, adding more nitric and nitrous acid to such solution, whereby mucic acid is formed, nitric and nitrous acids and oxides of nitrogen being given off during the formation and concentration of the mucic acid, and during the evaporation of the residual solution after separation of such mucic acid therefrom, recovering such nitric and nitrous acids and oxides, and treating more of the wood therewith.

10. In a process of the character described, the steps which consist in treating a quantity of western larch in the presence of water with a hydrolytic agent, drawing off the resulting galactose solution with residual hydrolytic agent, and then oxidizing the galactose solution.

11. In a process of the character described, the steps which consist in hydrolyzing a quantity of western larch, drawing off in solution the resulting sugar with residual acid, adding nitric and nitrous acid to such solution, separating out the mucic acid thus formed, and using the residual acid solution to hydrolyze more wood.

12. In a process of the character described, the steps which consist in hydrolyzing a quantity of western larch, drawing off in solution the resulting sugar with residual acid, adding nitric and nitrous acid to such solution, separating out the mucic acid thus formed, and using the residual acid solution to oxidize more sugar solution.

13. In a process of the character described, the steps which consist in hydrolyzing a quantity of western larch, drawing off in solution the resulting sugar with residual acid, adding nitric and nitrous acid to such solution, whereby mucic acid is formed, nitric and nitrous acids and oxides of nitrogen being given off during the formation and concentration of the mucic acid, and during the evaporation of the residual solution after separation of such mucic acid therefrom, recovering such nitric and nitrous acids and oxides, and treating more of the western larch therewith.

14. In a process of the character described, the steps which consist in hydrolyzing a quantity of western larch, drawing off in solution the resulting sugar with residual acid, adding nitric and nitrous acid to such solution, whereby mucic acid is formed, nitric and nitrous acids and oxides of nitrogen being given off during the formation and concentration of mucic acid, and during the evaporation of the residual solution after separation of such mucic acid therefrom, recovering such nitric and nitrous acids and oxides, and treating more of the sugar solution therewith.

15. In a process of the character described, the steps which consist in hydrolyzing a quantity of western larch, drawing off in solution the resulting sugar with residual hydrolytic agent, neutralizing or removing such hydrolytic agent, adding nitric and nitrous acids to such resulting sugar solution, whereby mucic acid is formed, nitric and nitrous acids and oxides of nitrogen being given off during the formation and concentration of mucic acid, and during the evaporation of the residual solution after separation of such mucic acid therefrom, recovering such nitric and nitrous acids and oxides, and treating more of the sugar solution therewith.

16. In a process of the character described, the steps which consist in hydrolyzing a quantity of western larch, oxidizing the resulting sugar solution and forming mucic acid, separating such mucic acid from such solution, dissolving such mucic acid in ammonia, clarifying such solution, liberating mucic acid from such ammonia solution by treatment with an appropriate acid body, recovering such mucic acid, and recovering the ammonium salt from such solution.

17. In a process of the character described, the steps which consist in hydrolyzing a quantity of western larch, oxidizing the resulting sugar solution and forming mucic acid, separating such mucic acid from such solution, dissolving such mucic acid in ammonia, clarifying such solution, liberating mucic acid from such ammonia solution by treatment with an appropriate acid body, recovering such mucic acid, recovering the ammonia from such solution, and using such ammonia to dissolve more mucic acid.

18. In a process of the character described, the steps which consist in hydrolyzing a quantity of western larch, drawing off in solution the resulting sugar with residual hydrolytic agent, neutralizing or removing such hydrolytic agent, adding nitric and nitrous acids and a catalyzer to such resulting sugar solution, whereby mucic acid is formed, nitric and nitrous acids and oxides of nitrogen being given off during the formation and concentration of mucic acid, and during the evaporation of the residual solution after separation of such mucic acid therefrom, recovering such nitric and nitrous acids and oxides, and treating more of the sugar solution therewith.

19. In a process of the character described, the steps which consist in hydrolyzing a quantity of western larch, drawing off in solution the resulting sugar, adding nitric and nitrous acids to such resulting sugar, and treating such resulting solution with oxides of nitrogen.

20. In a process of the character described, the steps which consist in hydrolyzing a quantity of western larch, drawing off in solution the resulting sugar, adding nitric and nitrous acids to such resulting sugar, and treating such resulting solution with oxygen.

21. In a process of the character described, the steps which consist in extracting a quantity of western larch with an aqueous solvent of galactan, drawing off in solution the resulting carbohydrate, and treating such solution with an oxidizing agent.

22. In a process of the character described, the steps which consist in treating one part of western larch with about three parts of water and a hydrolytic agent at below 140° C., drawing off in solution the resulting sugar with residual hydrolytic agent, treating a fresh quantity of western larch with such solution, drawing off the resulting sugar solution with residual hydrolytic agent, discontinuing contact of the solution with the hydrolytic agent, concentrating the solution, adding to such sugar solution about three parts of nitric and nitrous acids to one part of sugar at about 65° C. to 85° C., whereby mucic acid is formed, nitric and nitrous acids and oxides of nitrogen being given off during the formation and concentration of the mucic acid, and during the evaporation of the residual solution after separation of such mucic acid therefrom, recovering such nitric and nitrous acids and oxides of nitrogen, and treating more of the sugar therewith.

23. In a process of the character described, the steps which consist in treating one part of western larch with about three parts of water and a hydrolytic agent below 100° C., drawing off in solution the resulting sugar with residual hydrolytic agent, treating a fresh quantity of western larch with such solution, drawing off the resulting sugar solution with residual hydrolytic agent, adding to the hydrolyzed sugar solution, in a concentrated state about three parts of nitric and nitrous acids to one part of sugar at about 65° C. to 85° C., whereby mucic acid is formed, nitric and nitrous acids and oxides of nitrogen being given off during the formation and concentration of the mucic acid, and during the evaporation of the residual solution after separation of such mucic acid therefrom, recovering such nitric and nitrous acids and oxides of nitrogen, and treating more of the sugar therewith.

24. The method of purifying galactan extracts obtained from the wood of the western larch from contained tannin, which comprises removing the precipitated tannins from the said extracts, and oxidizing the sugars into mucic acid.

25. The method of effecting the oxidation to mucic acid of the galactan extracted from the wood of the western larch, which comprises heating the extract of such galactan with acid to bring about the precipitation of tannins therefrom and hydrolysis of the galactan to galactose and subjecting the hydrolyzed and purified extract to oxidation with nitric acid.

26. The method of purifying extracts contained from wood of the western larch, which comprises heating the same with sulfuric acid to a sufficient temperature and for a sufficient time to bring about the precipitation of tannin therefrom, and neutralizing the acid with calcium carbonate.

27. The method of effecting the oxidation to mucic acid of carbohydrates extracted from wood of the western larch, which comprises heating an extract of such carbohydrate with sulfuric acid for a sufficient time and at a sufficient temperature to bring about precipitation of tannin therefrom, separating the precipitated tannins, and subjecting to purified extract to oxidation with nitric acid.

28. The method of effecting the oxidation to mucic acid of carbohydrates derived from the wood of the western larch, which comprises heating solutions or extracts of such carbohydrates with nitric acid to bring about the oxidation thereof to mucic acid, drawing off the oxides of nitrogen formed during the oxidation, absorbing such oxides in carbohydrate solutions capable of yielding mucic acid on oxidation and utilizing such solutions for further oxidation treatments.

29. The method of effecting the oxidation of carbohydrates derived from the wood of the western larch, which comprises subjecting the same to oxidation with nitric acid, drawing off and admixing with air the oxides of nitrogen formed during the oxidation and thereby bringing about a further oxidation of the lower oxide or oxides by the air, absorbing the resulting oxides in a carbohydrate solution capable of yielding mucic acid on oxidation and utilizing such solution in the further oxidation treatment.

30. The method of effecting the oxidation to mucic acid of carbohydrate extracts from the wood of the western larch, which comprises subjecting such extracts to oxidation with nitric acid, absorbing the oxides of nitrogen given off during the oxidation in further amounts of such carbohydrate extracts, and progressively and systematically enriching such extracts in absorbed oxides, and subjecting the resulting enriched carbohydrate extracts to further oxidation treatment.

31. The method of effecting the oxidation to mucic acid of carbohydrate extracts from the wood of the western larch, which comprises subjecting such extracts to oxidation with nitric acid, drawing off the oxides of nitrogen formed in admixture with air and absorbing the hot oxides in a carbohydrate extract capable of yielding mucic acid on oxidation until such extract has been heated and preliminarily oxidized thereby, adding to such extract such further amounts of nitric acid as are required for completion of the operation and subjecting the same to an oxidation treatment for completion of the oxidation.

32. The method of effecting the oxidation to mucic acid of carbohydrate extracts from the wood of the western larch, which comprises oxidizing such extracts with nitric acid, drawing off the oxides of nitrogen formed during the oxidation, passing such oxides through a series of absorption vessels containing carbohydrate extracts capable of yielding mucic acid on oxidation, and thereby progressively absorbing such oxides and enriching such carbohydrate extracts, utilizing the richest of such extracts in admixture with further parts of nitric acid for the production of mucic acid and progressively increasing the content of absorbed oxides of nitrogen in the remaining absorption carbohydrate extracts, whereby the extracts are progressively enriched, and the richest extracts are utilized, together with added nitric acid, for the oxidation.

33. The method of effecting the recovery of oxides of nitrogen given off during the oxidation to mucic acid of carbohydrate extracts from the wood of the western larch, which comprises absorbing such oxides in the towers of a nitric acid recovery system by means of further amounts of carbohydrate extract capable of yielding mucic acid on oxidation, adapted for oxidation and without requiring the concentration of dilute nitric acid solutions before the oxidation.

34. The method of effecting the oxidation to mucic acid of carbohydrate extracts of wood of the western larch, which comprises heating such extracts with acid to convert tannins therein into an insoluble state, removing the insoluble tannins, subjecting the thus preliminarily purified extracts to oxidation with nitric acid, recovering the oxides of nitrogen formed during the oxidation by absorption in further amounts of carbohydrate extract, and utilizing the carbohydrate extracts containing the absorbing oxides for the further carrying out of the oxidation treatment.

35. The method of oxidizing organic substances in solution, which comprises subjecting the same to oxidation with nitric acid at an elevated temperature, drawing off the hot oxides of nitrogen formed and subjecting them to oxidation with air, absorbing the hot oxides in a further amount of the solution to effect the preliminary heating and oxidation thereof, and subjecting the resulting preliminarily oxidized solution to a further oxidation treatment for completion of the oxidation.

36. The method of effecting the oxidation of organic substances which comprises heating the same with nitric acid to a temperature sufficient to bring about spontaneous oxidation by the heat of reaction, drawing off the oxides of nitrogen formed and oxidizing the same, and absorbing the oxides while still hot in further amounts of the organic substances to effect preliminary oxidation thereof.

37. The method of effecting the recovery of oxides of nitrogen from hot gaseous mixtures containing them and of effecting the simultaneous oxidation of aqueous solutions of oxidizable materials therewith, which comprises circulating the solution and the hot gases containing the oxides of nitrogen into intimate contact with each other and in opposite directions, whereby the solution is preheated and progressively enriched in nitric and nitrous acids and subjected to the oxidizing action thereof and the gases are progressively impoverished in oxides of nitrogen.

38. The method of effecting the oxidation of solutions of organic substances, which comprises subjecting the same to oxidation with nitric acid at an elevated temperature, drawing off the oxides of nitrogen formed, in admixture with air, and introducing the resulting mixture while still hot into a series of absorption vessels through which further amounts of the solution to be oxidized are flowing in the counter-current and thereby progressively cooling the gaseous mixture and progressively absorbing the oxides therefrom, and utilizing the resulting solution in a preheated and enriched condition for further oxidation.

39. Granular mucic acid.

40. Macroscopic crystalline mucic acid.

41. In the manufacture of mucic acid by oxidation of galactose in solution, the herein described step of leading into such solution, in the persenece of an oxidizing agent capable of oxidizing sugars, gaseous substances containing an oxide of nitrogen.

42. A process of producing valuable products which comprises subjecting a galactose-yielding substance to the action of nitric and nitrous acids, of a concentration adapted to oxidize the galactose.

43. A process which comprises subjecting a galactose-yielding substance to the action of nitric and nitrous acids, in the presence of added oxides of nitrogen.

44. The process of producing valuable products which comprises subjecting galactose-yielding substances to the action of nitric acid in the presence of an oxygen compound of trivalent nitrogen to form mucic and oxalic acids, separating out the mucic acid, increasing the content of the residual solution with regard to the galactose yielding substances, reoxidizing the solution thus obtained, repeating the fortification of the solution and its subsequent oxidation, and finally separating oxalic acid from the solution.

45. The process which comprises oxidizing galactose by nitric acid containing an oxygen compound of trivalent nitrogen, separating out the mucic acid formed, and using the residual acid solution to oxidize further galactose.

46. The process of producing valuavle products which comprises subjecting galactose to oxidation with nitric and nitrous acids, concentrating the mixture containing mucic acid, recovering the oxides of nitrogen and nitrogen acids given off during the oxidation and concentration steps, and treating further quantities of the galactose with the recovered products.

47. The process which comprises subjecting galactose to oxidation by means of an oxygen compound of trivalent nitrogen present at the beginning of the process and throughout the process.

48. The process as set forth in claim 47 wherein there is also present an oxygen compound of pentavalent nitrogen.

49. The method of converting a sugar into its corresponding acid which ccmprises subjecting the sugar to the action of an oxygen compound of trivalent nitrogen present at the beginning of the process and throughout the process.

50. The method of treating wood products which comprises subjecting a sugar obtained by hydrolysis from wood to oxidation by means of a gaseous oxidizing agent in the presence of oxyden to form a difficultly soluble acid, separating the latter, and using the residual solution to hydrolyze further quantities of the wood.

51. The process of producing valuable products which comprises subjecting galactose-containing material derived from western larch, to oxidation by an oxygen-containing compound of nitrogen, absorbing the oxygen-containing compounds of nitrogen evolved during oxidation in a sugar solution containing nitric acid, and treating western larch carbohydrates with such absorption solution.

52. The process of treating western larch which comprises extracting comminuted western larch by a hydrolyzing agent containing sulphuric acid, and then subjecting the extract to oxidation by an oxygen acid of nitrogen.

53. The process of treating western larch which comprises extracting western larch chips by a hydrolyzing agent containing an oxygen acid of nitrogen, and then subjecting the extract to oxidation by means of an oxygen acid of nitrogen.

54. The process of treating western larch which comprises treating comminuted western larch with a hydrolytic agent in the presence of steam, and then oxidizing the extract to mucic acid.

55. The process of treating western larch which comprises treating comminuted western larch with a hydrolytic agent in the presence of steam, removing the excess of hydrolytic agent, and then oxidizing the extract to mucic acid.

56. The process of treating western larch which comprises cooking comminuted western larch with steam, extracting galactose-yielding material from such chips, and converting the galactose-yielding material into mucic acid by oxidation.

57. The method of effecting the oxidation to mucic acid of the galactan extracted from the wood of the western larch which comprises removing tannins from the extract, concentrating such extract and subjecting the so purified and concentrated extract to oxidation with nitric acid.

58. The method of effecting the oxidation to mucic acid of carbohydrates derived from the wood of the western larch, which comprises heating solutions of extracts of such carbohydrates with nitric acid to bring about the oxidation thereof to mucic acid, drawing off the oxides of nitrogen formed during the oxidation, absorbing such oxides in carbohydrate solutions capable of yielding mucic acid on oxidation and utilizing such solutions for further oxidation treatments.

59. The method of effecting the oxidation of carbohydrates derived from the wood of western larch which comprises subjecting the same to oxidation with nitric acid, drawing off and admixing with air the oxides of nitrogen and contacting same with a carbohydrate solution capable of yielding mucic acid on oxidation and utilizing such solution in the further oxidation treatment.

60. The method of effecting the oxidation to mucic acid of carbohydrate extracts from the wood of the western larch, which comprises subjecting extracts from western larch to oxidation with nitric acid, drawing off the oxides of nitrogen formed in admixture with air, and absorbing the hot oxides in a carbohydrate extract capable of yielding mucic acid on oxidation until such extracts have been heated and preliminarily oxidized thereby, adding to such extracts such further amounts of nitric acid as are required for completion of the operation and subjecting the same to an oxidation treatment for completion of the oxidation.

61. The method of effecting the recovery of oxides of nitrogen given off during the oxidation of mucic acid of carbohydrate extracts from the wood of the western larch, which comprises absorbing such oxides in the towers of a nitric acid recovery system by means of further amounts of carbohydrate extract capable of yielding mucic acid on oxidation, adapted for oxidation and without requiring the concentration of dilute nitric acid solution before the oxidation.

62. In a process of the character described, the steps which consist in oxidizing galactose to mucic acid by treating a solution of such galactose with a mixture of nitric and nitrous acids, separating out the mucic acid thus formed and adding the residual acid solution to more of the galactose solution.

63. In a process of the character described, the steps which consist in oxidizing galactose to mucic acid by nitric and nitrous acids, separating out the mucic acid thus formed, and recovering nitrogen-oxygen compounds during said process.

64. In a process of the character described, the steps which consist in oxidizing galactose to mucic acid by treating a solution of such galactose with a mixture of nitric and nitrous acids, and oxides of nitrogen, and during the evaporation of the residual solution after separation of such mucic acid and oxides, recovering the said oxides given off during the evaporation and treating more galactose solution therewith.

65. In a process of the character described, the steps which consist in hydrolyzing a quantity of wood with nitric and nitrous acids, drawing off in solution the oxidation products, separating out the mucic acid formed, and using the residual acid solution to hydrolyze more wood.

66. A process of producing granular mucic acid which comprises subjecting a galactose-containing solution derived from western larch to oxidation to mucic acid and separating the mucic acid in a granular condition from the mother liquor.

67. In making mucic acid by oxidation of a sugar-containing material comprising galactose, the herein described improvement which comprises the steps of continuous oxidation thereof by a reagent containing nitric acid and oxides of nitrogen, in the proportion of about two to five parts of nitric acid to one of said sugar, and the continuous recovery of the oxidation and reduction products.

S. F. ACREE.